(12) United States Patent
Matsuzaki

(10) Patent No.: US 7,606,961 B2
(45) Date of Patent: Oct. 20, 2009

(54) COMPUTER SYSTEM AND DATA PRE-FETCHING METHOD

(75) Inventor: Hidenori Matsuzaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 58 days.

(21) Appl. No.: 11/476,534

(22) Filed: Jun. 28, 2006

(65) Prior Publication Data

US 2008/0005443 A1 Jan. 3, 2008

(51) Int. Cl.
*G06F 13/36* (2006.01)
*G06F 13/28* (2006.01)
*G06F 11/00* (2006.01)

(52) U.S. Cl. ............................ 710/308; 710/22; 710/23; 710/24; 710/25; 710/26; 710/27; 710/28; 711/E12.035; 711/E12.067; 714/9

(58) Field of Classification Search ................. 710/308, 710/56, 526, 22–28; 711/E12.035, E12.067; 714/9
See application file for complete search history.

(56) References Cited

U.S. PATENT DOCUMENTS

| | | | |
|---|---|---|---|
| 6,338,095 B1 * | 1/2002 | Yasuda et al. ............... 709/250 |
| 6,760,817 B2 | 7/2004 | Arimilli et al. | |
| 6,785,888 B1 * | 8/2004 | McKenney et al. ......... 718/104 |
| 6,804,729 B2 | 10/2004 | Swanberg | |
| 6,985,976 B1 * | 1/2006 | Zandonadi et al. ............ 710/56 |
| 7,085,959 B2 * | 8/2006 | Safford ........................ 714/11 |
| 7,114,042 B2 * | 9/2006 | Day et al. .................... 711/152 |
| 7,120,752 B2 * | 10/2006 | Wilson et al. ............... 711/135 |
| 7,299,341 B2 * | 11/2007 | Lin ............................. 712/200 |
| 2003/0115385 A1 * | 6/2003 | Adamane et al. .............. 710/22 |
| 2005/0246500 A1 * | 11/2005 | Iyer et al. .................... 711/137 |
| 2006/0129767 A1 * | 6/2006 | Berenyi et al. .............. 711/154 |
| 2006/0265533 A1 * | 11/2006 | Hobson et al. .............. 710/120 |
| 2007/0234088 A1 * | 10/2007 | Marshall et al. ............. 713/320 |

OTHER PUBLICATIONS

Nikola Vujic' et al, Automatic Pre-fetch and Modulo Scheduling Transformations for the Cell BE Architecture, NA, Barcelona Supercomputing Center.*

* cited by examiner

*Primary Examiner*—Mark Rinehart
*Assistant Examiner*—Christopher A Daley
(74) *Attorney, Agent, or Firm*—Sprinkle IP Law Group

(57) ABSTRACT

A computer system according to an example of the invention comprises SPEs and a global memory. The SPEs include a running SPE and an idling SPE. The running SPE and the idling SPE each have a processor core, local memory and DMA module. The local memory of the idling SPE stores data stored in the global memory and used by the processor core of the running SPE, before the data is used by the processor core of the running SPE. The DMA module of the running SPE reads the data from the local memory of the idling SPE, and transfers the data to the processor core of the running SPE.

18 Claims, 3 Drawing Sheets

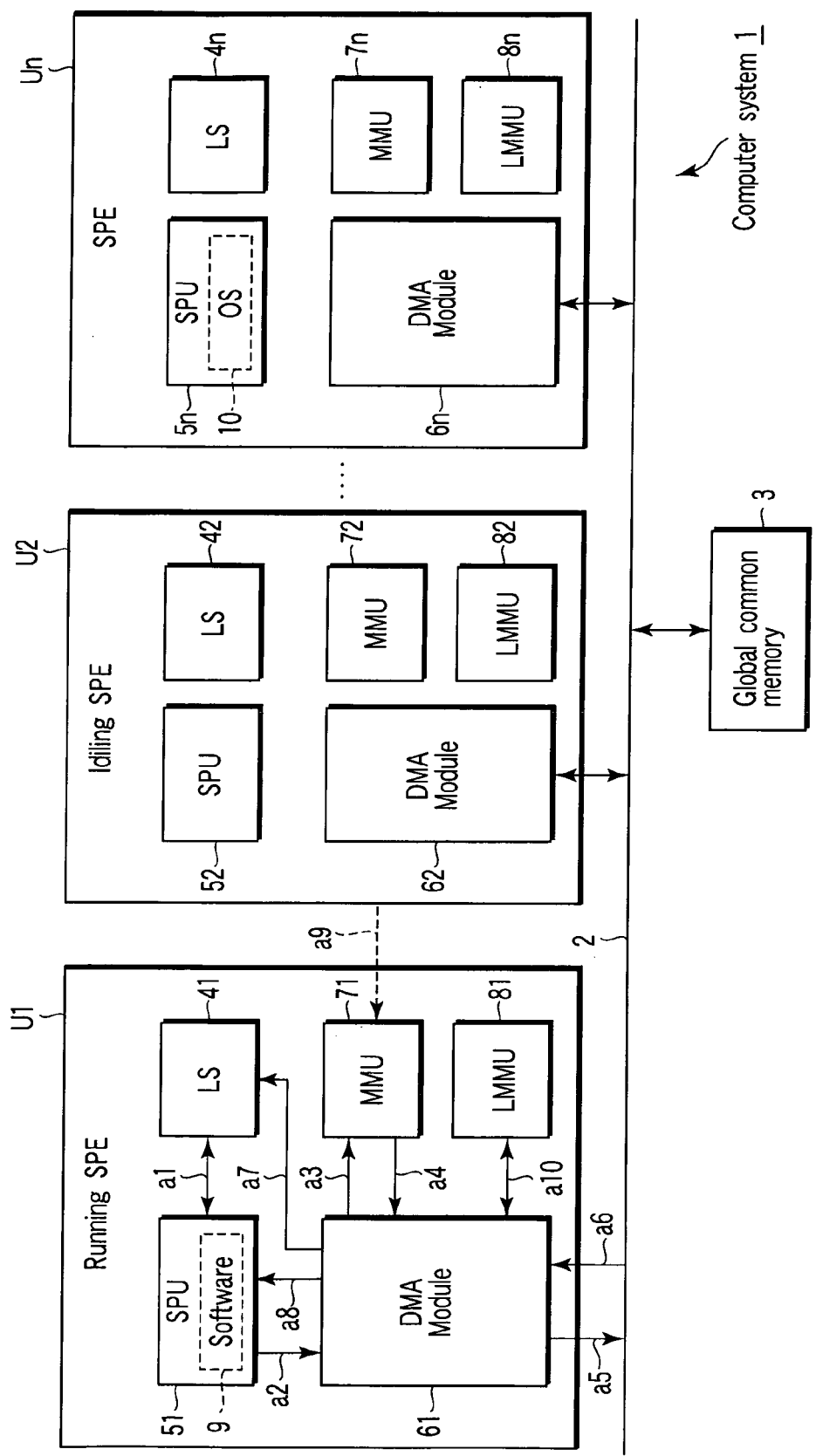
F I G. 1

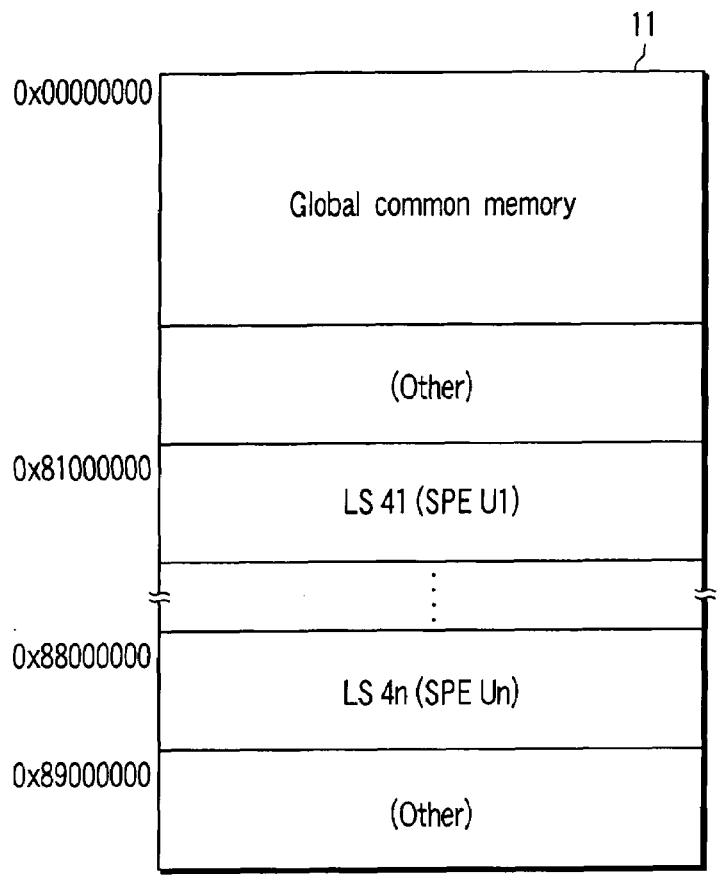
F I G. 2
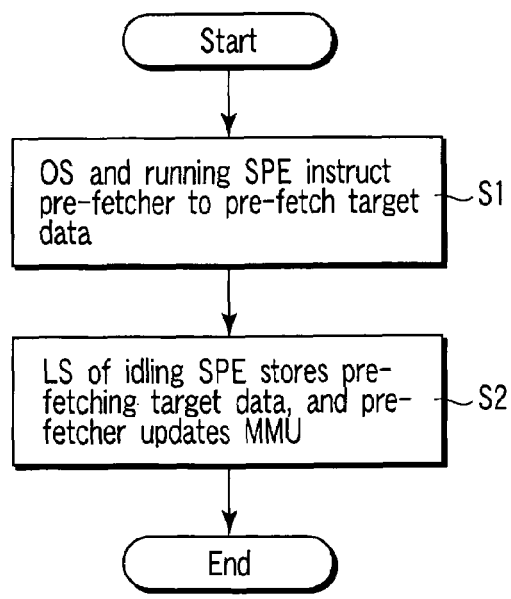
F I G. 3

007# COMPUTER SYSTEM AND DATA PRE-FETCHING METHOD

BACKGROUND OF THE INVENTION

1. Field of the Invention

The present invention relates to a computer system and data pre-fetching method.

2. Description of the Related Art

Conventional multiple processing elements (SPEs) can transmit and receive data between them via a bus, and access a global common memory via the bus.

Each SPE comprises a LS (local memory or scratch pad memory).

Each SPE reads load data from the global common memory via the bus when the load data is not stored in the LS comprised in itself. And each SPE stores store data to the global common memory via the bus if the SPE cannot store the store data in the LS comprised in itself.

BRIEF SUMMARY OF THE INVENTION

A computer system according to an example of the invention comprises multiple processing elements and a global memory. The multiple processing elements include a running multiple processing element and an idling multiple processing element. The running multiple processing element and the idling multiple processing element each have a processor core, local memory and DMA module. The local memory of the idling multiple processing element stores data stored in the global memory and used by the processor core of the running multiple processing element, before the data is used by the processor core of the running multiple processing element. The DMA module of the running multiple processing element reads the data from the local memory of the idling multiple processing element, and transfers the data to the processor core of the running multiple processing element.

BRIEF DESCRIPTION OF THE SEVERAL VIEWS OF THE DRAWING

FIG. 1 is a block diagram illustrating examples of multiple processing elements of the embodiment.

FIG. 2 shows an example of a physical memory map employed in the embodiment.

FIG. 3 is a flowchart illustrating an example of a pre-fetching process employed in the embodiment.

DETAILED DESCRIPTION OF THE INVENTION

Figure 4:
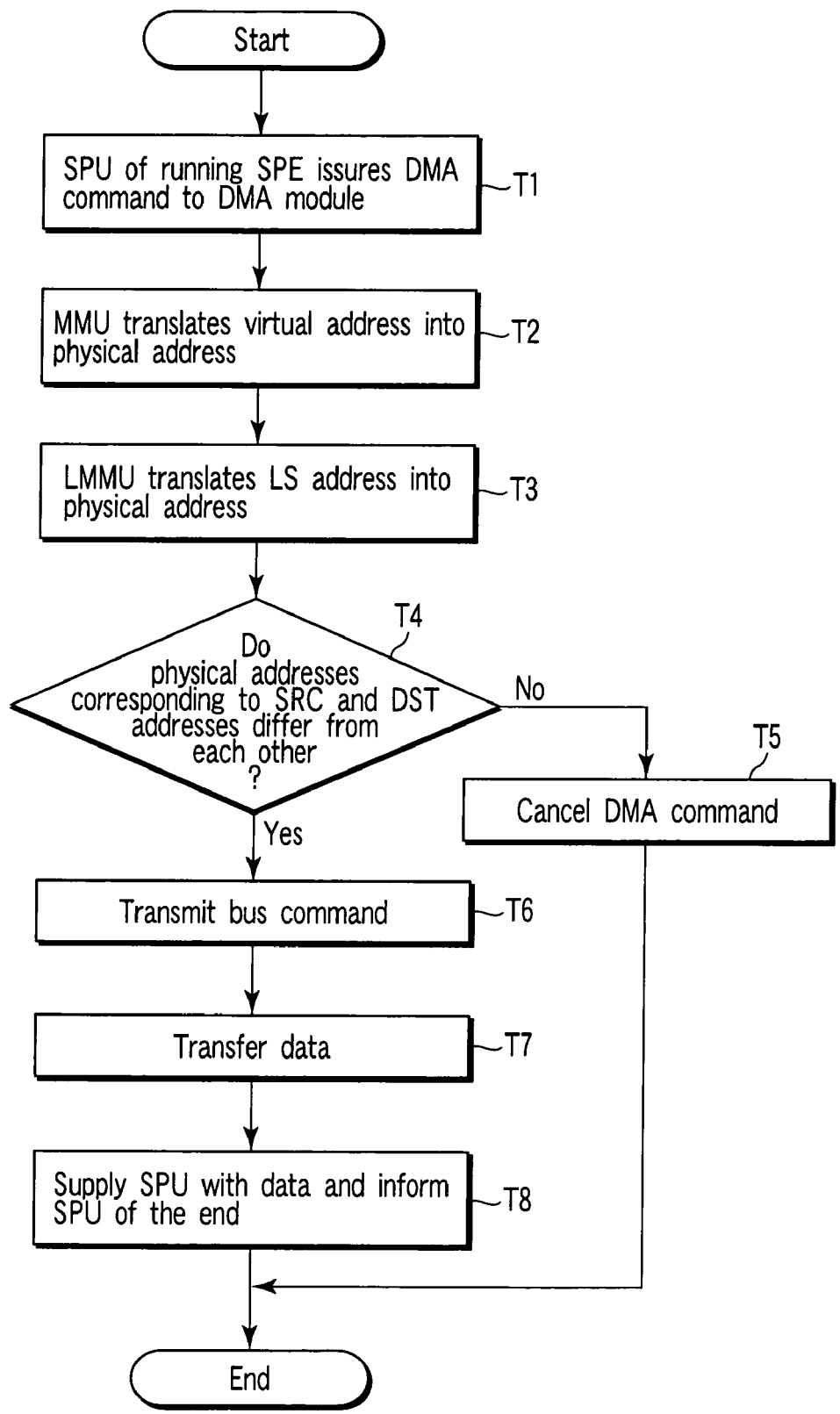
FIG. 4 is a flowchart illustrating an example of a procedure for canceling a DMA command of the embodiment.

An embodiment of the invention will be described with reference to the accompanying drawings.

FIG. 1 is a block diagram illustrating examples of multiple processing elements (SPEs).

As shown, a computer system 1 comprises SPEs U1 to Un, a bus 2 and global common memory 3. The SPEs U1 to Un can transmit and receive data between them via the bus 2, and can access the global common memory 3 via the bus 2.

The SPEs U1 to Un comprise LSs 41 to 4n, processor cores (SPUs) 51 to 5n, direct memory access (DMA) modules 61 to 6n, memory management units (MMUs) 71 to 7n, and local memory management units (LMMUs) 81 to 8n. The SPEs U1 to Un are operable individually (in parallel). The MMUs 71 to 7n perform address conversion.

In the case of FIG. 1, it is assumed that the SPU 51 of the SPE U1 is running software 9, the SPE U2 is in the idle state, and the SPU 5n of the SPE Un is executing an OS 10.

The computer system 1 performs a software page pre-fetching from the global common memory 3 to the LS 42 of the idling SPE U2.

In the embodiment, the software 9 operating on the SPU 51 can access the LSs 41 to 4n of the SPEs U1 to Un via the DMA modules 61 to 6n. If pre-fetching has succeeded, the software 9 does not have to access the global common memory 3.

The software 9 of the SPE U1 performs DMA to transfer data from the global common memory 3 to the own LS 41 of the SPE U1.

And the software 9 of the SPE U1 performs DMA to transfer data from the own LS 41 of the SPE U1 to the global common memory 3.

A global memory space of the computer system 1 is formed by a memory space of the global common memory 3 and spaces of all of the LSs 41 to 4n of the SPEs U1 to Un.

A bandwidth of the global common memory 3 is less than the sum of all bandwidths of the SPEs U1 to Un.

The bandwidth of the global common memory 3 is less than a bandwidth of the bus 2.

The bus 2 allows multiple data transfers to be processed simultaneously.

The DMA modules 61 to 6n transfer data between the LSs 41 to 4n of the SPEs U1 to Un.

Data transfers between the LSs 41 to 4n by the DMA modules 61 to 6n are faster than data transfers between the global common memory 3 and the LSs 41 to 4n by the DMA modules 61 to 6n.

A DMA command comprises a direction (PUT or GET), Virtual Address, LSA (LS Address) and TS (Transfer Size).

The Virtual Address is translated to a Physical Address by the MMU.

A page (data) may be pre-fetched from the global common memory 3 to the LS 42 of idling SPE U2 for a DMA GET.

A page may be pre-fetched from the global common memory 3 to the running SPE U1 which will use the page in future and a DMA request of the SPE U1 to get the page is canceled if the page is already pre-fetched for the DMA GET.

A page may be pre-fetched from the global common memory 3 to running SPE U1 which has unoccupied bandwidth and unoccupied LS area for DMA GET.

At first, data may be buffered into LSs 41 to 4n and the data may be written back to the global common memory 3 next for DMA PUT.

To improve the performance of the computer system 1, the system 1 determines a page to be pre-fetched.

For example, a MALLOC function is hooked by the idling SPE U2 which is assigned a page pre-fetching task. The idling SPE U2 which is assigned the page pre-fetching task is a pre-fetcher. The pre-fetcher and the OS 10 speculatively perform the MALLOC function in a code of running SPE U1, reserve the page and pre-fetch the page.

The pre-fetcher creates a timing chart of all running SPE's major DMA amount and major calculation amount, and finds a time slot in which a memory bandwidth is exhausted and a time slot in which a memory bandwidth is unoccupied. Then the pre-fetcher reschedules a data transfer timing not to exhaust the memory bandwidth by an using LS as a buffer with a pre-fetching mechanism.

To perform a page pre-fetching, the OS 10 used the computer system 1 assigns the page perfecting task to the idling SPE U2.

The page pre-fetching task comprises a communication interface to the OS 10, a code analyzer and a code which is running on other SPEs.

Also, the pre-fetcher reserves some parts of own LS 42 for a pre-fetched page. A page pre-fetching code dynamically determine which a page should be pre-fetched and issues a DMA to perform a pre-fetching, then the MMU entry of the running SPE U1 will be replaced if the page pre-fetching is performed.

For example, the page pre-fetching is performed with either one of following sequences.

In the sequence of the first example, When the MALLOC function is performed by the running SPE U1, the OS 10 reserves a part of allocated pages to be pre-fetched and notices the pre-fetcher to pre-load the part of allocated pages.

In the sequence of the second example, the pre-fetcher and the OS 10 perform a future MALLOC function of a SPE code speculatively and reserve a allocated page to be pre-fetched then load future allocated page into the LS 42 of the pre-fetcher.

A program code running on SPE has a hint field in front of major DMA operations and major loops. Here, a hint may be a constant value or a dynamic value updated by a profiler which is embedded in the program code or dynamically evaluated. Because the SPE code explicitly has the DMA commands associated with the Virtual Address, LSA and TS, it is easy to evaluate the dynamic value.

The code analyzer creates a timing chart comprising a data transfer and a calculation based on the hint then finds a time slot in which a memory bandwidth is exhausted and a time slot in which a memory bandwidth is unoccupied. The code analyzer reschedules a data transfer timing not to exhaust a memory bandwidth by using LS as a buffer.

Or the code analyzer may be any specific algorithm according to a combination of types of tasks of running SPEs, because the code analyzer is software running on a SPE.

In either one of above sequences, a MMU may be updated after a data transfer for a page pre-fetching is completed by the time that data is used. Otherwise, the data transfer may be happened between the global common memory 3 and a LS as usual and a pre-fetching DMA is cancelled.

In addition, a pre-load may be following direction instead of pre-loading from the global common memory 3 to the LS 42 of the pre-fetcher.

The computer system 1 may load a page from the global common memory 3 to the LS 42 of pre-fetcher and push the page to a SPE which will use the page in future then replace a MMU. If the pre-fetching is done, a DMA command which is trying to GET the page will be canceled. The computer system 1 requires a dynamic DMA command canceling mechanism.

The computer system 1 may load a page from the global common memory 3 to a LS of another SPE which is running and replace a MMU. The OS 10 should manage each SPE's required max bandwidth for both a PUT and a GET, also needs to manage unused LS sizes on each SPEs U1-Un and decides which a SPE can be used as a resource for pre-loading.

The computer system 1 may replace a MMU so that a PUT command in another running SPE sends data not to global common memory 3 directly but to a LS of another SPE, then write back the page later.

The Dynamic DMA command canceling mechanism allows to cancel a DMA command if a source and destination are same after an address translation.

Transfer of data performed in the embodiment will now be described.

The SPU 51 of the running SPE U1 starts processing while loading/storing data in the LS 41 (a1).

When it is necessary to transfer data from an external memory (such as the global common memory 3, the LS 42 to 4n of another SPE U2 to Un, etc.), the SPU 51 issues, to the DMA module 61, a DMA command to transfer data (a2).

The DMA command includes the address of the external memory, the LS address of the SPE U1, the size of data to be transferred (transfer size), and the direction of transfer.

The address of the external memory designated by the SPU 51 is a virtual address and differs from a physical address used on the bus 2. The LS address is internal address information used only in the SPE U1.

The DMA module 61 sends the virtual address to the MMU 71 to translate, into a physical address, the virtual address of the external memory contained in the DMA command (a3).

The MMU 71 refers to a table belonging thereto to acquire the physical address corresponding to the virtual address, and returns it to the DMA module 61 (a4).

The DMA module 61 supplies the bus 2 with a bus command to request the external memory to transfer data, using the physical address of the memory (a5).

Data transferred from the external memory is sent to the DMA module 61 via the bus 2 (a6).

Data transferred to the DMA module 61 is sent to the LS 41 via the internal bus of the SPE U1, using the address designated by the DMA command (a7).

After executing the DMA command, the DMA module 61 informs the SPU 51 of the completion of the command (a8).

If the idling SPE U2 performs pre-fetching, it rewrites the MMU 71 of the SPE U1 that uses the pre-fetched data later (a9).

To cancel the DMA command, the LMMU 81 translates, into the corresponding physical address, the LS address contained in the DMA command, and returns the physical address to the DMA module 61 (a10).

FIG. 2 shows an example of a physical memory map employed in the embodiment.

In the computer system 1, the global common memory 3 and the LSs 41 to 4n of the SPEs U1 to Un are mapped on a flat physical address space 11.

When a request including a physical address is output to the bus 2, a memory area on the physical address space 11 corresponding to the physical address can be accessed.

FIG. 3 is a flowchart illustrating an example of a pre-fetching process employed in the embodiment.

At step S1, the OS 10 and running SPE U1 instruct the pre-fetcher to pre-fetch target data stored in the global common memory 3 and used later by the running SPE U1.

At step S2, the pre-fetcher stores pre-fetching target data in the LS 42 of the idling SPE U2, and updates the MMU 71 of the running SPE U1, using a physical address assigned to an area that stores the pre-fetching target data.

FIG. 4 is a flowchart illustrating an example of a procedure for canceling a DMA command.

At step T1, the SPU 51 of the running SPE U1 issues a DMA command to the DMA module 61.

At step T2, the DMA module 61 supplies a virtual address to the MMU 71, which, in turn, translates the virtual address into the corresponding physical address, and returns the physical address to the DMA module 61.

At step T3, the DMA module 61 supplies a LS address to the LMMU 81, which, in turn, translates the LS address into the corresponding physical address, and returns the physical address corresponding to the LS address to the DMA module 61.

At step T4, the DMA module 61 determines whether the address of an originator of data transfer is identical to that of a data transfer destination, based on the physical address from the MMU 71 and that from the LMMU 81.

If they are identical to each other, the program proceeds to step T5, where the DMA command is canceled, and the SPU 51 receives the physical address from the DMA module 61, thereby accessing the LS 41 of the running SPE U1.

If the address of the originator of data transfer differs from that of the data transfer destination, the program proceeds to step T6, where the DMA module 61 supplies the bus 2 with a bus command using the physical address from the MMU 71 and requests data transfer for an external memory.

At step T7, the DMA module 61 receives data from the external memory.

At step T8, the DMA module 61 supplies the SPU 51 with the data received from the external memory, and informs it of the end of transfer processing.

When pre-fetching of a page is performed not with respect the idling SPE U2, but with respect to the LS 41 of the SPE U1 that actually requires the page, if only rewriting of the MMU 71 is performed, a DMA command to access the LS 41 of the running SPE U1 is issued from the SPU 51 of the running SPE U1 to the DMA module 61 of the running SPE U1.

However, in the embodiment, the DMA module 61 of the running SPE U1 determines whether the physical address of an originator of data transfer is identical to that of a data transfer destination, as described above. If it is determined that they are identical to each other, the process of transferring data to the same address is cancelled.

As described above in detail, in the embodiment, the efficiency of memory access is improved by pre-fetching data used in the near future and originally located in the global common memory 3, because memory access timing is rescheduled dynamically so as not to exhaust LS memory bandwidths. Further, the DMA performance is improved because the transfer of data from an LS to another LS is faster than the transfer of data from the global common memory 3 to an LS, and pre-fetching is done while the global common memory's bandwidth and bus's bandwidth are unoccupied.

The invention is not limited to the above-described embodiment, may be modified in various ways without departing from the scope. For instance, each LMMU 81 to 8n may incorporate the function of translating a physical address into an LS address, instead of the function of translating an LS address to a physical address. For example, the computer system 1 may be a processor provided with SPEs U1 to Un.

What is claimed is:

1. A computer system comprising multiple processing elements and a global memory, wherein:
    the multiple processing elements include a running multiple processing element and an idling multiple processing element;
    the multiple processing elements each have a processor core, local memory, a DMA module and a memory management unit;
    at least one of the local memories of the multiple processing elements stores data stored in the global memory and used by the processor core of the running multiple processing element, before the data is used by the processor core of the running multiple processing element, and
    the DMA module of the running multiple processing element reads the data from the local memory of the running multiple processing element when the data is stored in the local memory of the running multiple processing element and reads the data from the local memory of the idling multiple processing element via the DMA module of the idling multiple processing element when the data is stored in the local memory of the idling multiple processing element, and transfers the data to the processor core of the running multiple processing element using a physical address for the data stored in the memory management unit; and the physical address for the data stored in the memory management unit of running multiple processing element is updated to indicate the data stored in the local memory of the idling multiple processing element when the data is stored in the local memory of the idling multiple processing element.

2. The computer system according to claim 1, further comprising: a software which is performed by the running multiple processing element, accesses the local memory which stores the data and does not access the global memory.

3. The computer system according to claim 1, further comprising: a software which is performed by the running multiple processing element and translates data between the global memory and the local memories.

4. The computer system according to claim 1, wherein:
    the multiple processing elements each further include a local memory management unit which translates a local memory address included a DMA command into a physical address corresponding to the local memory address; and
    the DMA module of the running multiple processing element cancels data transfer when a physical address assigned to an originator of the data transfer is identical to a physical address assigned to a destination of the data transfer and requests the data transfer when the physical address assigned to the originator of the data transfer differs from the physical address assigned to the destination of the data transfer based on the physical address translated by the memory management unit, and the physical address corresponding to the local memory address.

5. The computer system according to claim 1, wherein the local memories and the global memory are mapped on a physical address space.

6. The computer system according to claim 1, wherein a bandwidth of the local memory is less than the sum of bandwidths of the multiple processing elements.

7. The computer system according to claim 6, wherein:
    the idling multiple processing element creates a timing chart of all running multiple processing element's major DMA amount and major calculation amount, finds a time slot in which a bandwidth is exhausted and a time slot in which the memory bandwidth is unoccupied; and
    the idling multiple processing element reschedules a data transfer timing not to exhaust the memory bandwidth by using the local memory of the idling multiple processing element as a buffer.

8. The computer system according to claim 1, further comprising: a bus connecting between the global memory and the multiple processing elements; and
    wherein a bandwidth of the global memory is less than a bandwidth of the bus.

9. The computer system according to claim 1, further comprising: a bus connecting between the memory and the multiple processing elements; and
    wherein the bus allows multiple data transfers to be processed simultaneously.

10. The computer system according to claim 1, wherein:
    the processor core of the running multiple processing element issues a DMA command comprising a PUT or GET direction, Effective Address, Local Memory Address and transfer size.

11. The computer system according to claim 10, wherein:
the Virtual Address is translated to a Physical Address by a memory management unit.

12. The computer system according to claim 10, wherein:
the data is pre-fetched from the global memory to the local memory of the idling multiple processing element for the GET direction.

13. The computer system according to claim 10, wherein:
the data is pre-fetched from the global memory to the local memory of the running multiple processing element which will use the data in future; and
the DMA module of the running multiple processing element cancels the DMA command to get the data if the data has been stored in the local memory of the running multiple processing element for the GET direction.

14. The computer system according to claim 10, wherein:
the data is pre-fetched from the global memory to the local memory of the running multiple processing element which has an unoccupied bandwidth and a local memory area for the GET direction.

15. The computer system according to claim 10, wherein:
stored data is buffered into the local memory of the running multiple processing element or idling multiple processing element first and stored to the global memory later for the PUT direction.

16. The computer system according to claim 1, wherein:
the idling multiple processing element hooks a MALLOC function.

17. The computer system according to claim 1, further comprising:
an operating system; and
wherein the operating system and the idling multiple processing element speculatively perform a MALLOC function in a code of the running multiple processing element, reserve the data and pre-fetch the data.

18. A data pre-fetching method by a computer system, wherein:
the computer system comprises multiple processing elements and a global memory;
the multiple processing elements comprise a running multiple processing element and an idling multiple processing element;
the multiple processing elements each have a processor core, local memory, a DMA module and a memory management unit; and
the method comprises
storing data stored in the global memory and used by the processor core of the running multiple processing element in at least one of the local memories of the multiple processing elements, before the data is used by the processor core of the running multiple processing element;
updating a physical address for the data stored in the memory management unit of the running multiple processing element to indicate the data stored in the local memory of the idling multiple processing element when the data is stored in the local memory of the idling multiple processing element; and
reading the data from the local memory of the running multiple processing element when the data is stored in the local memory of the running multiple processing element and reading the data from the local memory of the idling multiple processing element via the DMA module of the idling multiple processing element when the data is stored in the local memory of the idling multiple processing element and transfers the data to the processor core of the running multiple processing element by the DMA module of the running multiple processing element using the physical address for the data stored in the memory management unit.

* * * * *